US006239438B1

(12) United States Patent
Schubert

(10) Patent No.: US 6,239,438 B1
(45) Date of Patent: May 29, 2001

(54) DUAL ACQUISITION IMAGING METHOD AND APPARATUS

(75) Inventor: Scott F. Schubert, Delafield, WI (US)

(73) Assignee: General Electric Company, Waukesha, WI (US)

(*) Notice: Subject to any disclaimer, the term of this patent is extended or adjusted under 35 U.S.C. 154(b) by 0 days.

(21) Appl. No.: 09/196,408

(22) Filed: Nov. 19, 1998

(51) Int. Cl.$^7$ .................... G01T 1/17; G01T 1/164
(52) U.S. Cl. .................. 250/363.03; 250/363.02; 250/370.09; 250/363.07; 250/369; 600/436
(58) Field of Search .................. 250/362, 363.01, 250/363.02, 363.03, 363.07, 369, 370.08, 370.09, 321; 600/428, 436

(56) References Cited

U.S. PATENT DOCUMENTS

| 4,382,184 | * | 5/1983  | Wernikoff        | 378/37     |
|-----------|---|---------|------------------|------------|
| 5,337,231 | * | 8/1994  | Nowak et al.     | 600/425    |
| 5,576,548 | * | 11/1996 | Clarke et al.    | 250/369    |
| 5,625,190 | * | 4/1997  | Crandall         | 250/363.03 |
| 5,705,819 | * | 1/1998  | Takahashi et al. | 250/363.04 |
| 5,803,914 | * | 9/1998  | Ryals et al.     | 600/407    |
| 6,057,551 | * | 5/2000  | Tararine         | 250/363.03 |

\* cited by examiner

Primary Examiner—Constantine Hannaher
Assistant Examiner—Albert Gagliardi
(74) Attorney, Agent, or Firm—Quarles & Brady LLP; Christan G. Cabou

(57) ABSTRACT

A method and apparatus for simultaneously acquiring imaging data at two different resolutions, a high resolution data set using for forming a diagnostic image and a plurality of low resolution data sets used for various purposes including high resolution data correction for patient movement and data errors and for observing dynamic physiological occurrences.

18 Claims, 4 Drawing Sheets

DUAL ACQUISITION IMAGING METHOD AND APPARATUS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to medical imaging generally and more specifically to a method for acquiring several data acquisition sets during an acquisition period wherein at least one of the acquisitions is a high resolution acquisition and other acquisitions have relatively lesser resolution but are useful for various purposes in addition to generating an image.

Positrons are positively charged electrons which are emitted by radio nuclides that have been prepared using a cyclotron or other device. The radio nuclides most often employed in diagnostic imaging are fluorine-18 ($^{18}$F), carbon-11 ($^{11}$C), nitrogen-13 ($^{13}$N), and oxygen-15 ($^{15}$O). Radio nuclides are employed as radioactive tracers called "radiopharmaceuticals" by incorporating them into substances such as glucose or carbon dioxide. One common use for radiopharmaceuticals is in the medical imaging field.

To use a radiopharmaceutical in imaging, the radiopharmaceutical is injected into a patient and accumulates in an organ, vessel or the like, which is to be imaged. It is known that specific radiopharmaceuticals become concentrated within certain organs or, in the case of a vessel, that specific radiopharmaceuticals will not be absorbed by a vessel wall. The process of concentrating often involves processes such as glucose metabolism, fatty acid metabolism and protein synthesis. Hereinafter, in the interest of simplifying this explanation, an organ to be imaged will be referred to generally as an "organ of interest" and prior art and the invention will be described with respect to a hypothetical organ of interest.

After the radiopharmaceutical becomes concentrated within an organ of interest and while the radio nuclides decay, the radio nuclides emit positrons. The positrons travel a very short distance before they encounter an electron and, when the positron encounters an electron, the positron is annihilated and converted into two photons, or gamma rays. This annihilation event is characterized by two features which are pertinent to medical imaging and particularly to medical imaging using photon emission tomography (PET). First, each gamma ray has an energy of essentially 511 keV upon annihilation. Second, the two gamma rays are directed in substantially opposite directions.

In PET imaging, if the general locations of annihilations can be identified in three dimensions, a three dimensional image of an organ of interest can be reconstructed for observation. To detect annihilation locations, a PET camera is employed. An exemplary PET camera includes a plurality of detectors and a processor which, among other things, includes coincidence detection circuitry. For the purposes of this explanation it will be assumed that a camera includes 12,000 detectors which are arranged to form an annular gantry about an imaging area. Each time a 511 keV photon impacts a detector, the detector generates an electronic signal or pulse which is provided to the processor coincidence circuitry.

The coincidence circuitry identifies essentially simultaneous pulse pairs which correspond to detectors which are essentially on opposite sides of the imaging area. Thus, a simultaneous pulse pair indicates that an annihilation has occurred on a straight line between an associated pair of detectors. Over an acquisition period of a few minutes millions of annihilations are recorded, each annihilation associated with a unique detector pair. After an acquisition period, recorded annihilation data can be used via any of several different well known back projection procedures to construct the three dimensional image of the organ of interest.

To compress annihilation data somewhat, instead of separately storing an indication of each detected annihilation, a typical PET processor simply stores a separate counter for each possible "meaningful" detector pair. What is meant by the term "meaningful" is that there are certain theoretically possible detector pairs which will almost certainly never provide a true annihilation indication. For example, because an annihilation typically sends gamma rays in opposite directions and annihilation points are within an imaging area, it is essentially impossible for two adjacent detectors to provide a true annihilation indication. Similarly, other detectors which are disposed in the same general area as a first detector cannot provide a true annihilation indication along with the first detector. Thus, proximate detectors are not meaningful pairs and the processor does not provide a counter for these pairs.

In addition, the number of meaningful detector pairs is also limited by the fact that certain detector pairs are positioned such that the organ of interest, and any radiopharmaceutical accumulated therein, is not within the space therebetween. In this case, once again, the detector pair cannot provide a true annihilation indication. Thus, while theoretically it is possible to have approximately 144 million detector pairs where there are 12,000 detectors, instead of providing 144 million counters and memory required to store 144 million annihilation counts, the meaningful number of detector pairs and hence processor counters, can be reduced to approximately 25 million. Hereinafter, it will be assumed that memory required to store data corresponding to a single acquisition consists of 25 megabytes (Mb), one byte for each meaningful detector pair.

Given a specific radiopharmaceutical (i.e. a substance characterized by a known positron emission rate), acquisition period duration is primarily dependent upon required image quality. Thus, in cases where poor quality images are acceptable, fewer annihilation events have to be detected to create an image and acquisition period duration can be reduced. However, where high quality images are acceptable, a large number of annihilations must be detected and the acquisition period is typically relatively long. Where an image is to be used for medical diagnostics, usually high quality is extremely important and therefore acquisition periods tend to be relatively long. For the purposes of this explanation it will be assumed that, given a specific radiopharmaceutical, annihilation detections are required over a twenty minute period.

During an acquisition period there are several sources of annihilation detection error. Two of the more prominent sources of detection error are referred to as "dead time" and "randoms". The phenomenon known as dead time occurs when two gamma rays impact a single detector at essentially the same time so that the total absorbed energy far exceeds 511 keV or so that, while a first of the rays is being processed by the detector, a second of the rays is ignored by the detector. In these cases, either one or two annihilations are not recognized and an error occurs.

The phenomenon known as randoms occurs when gamma rays from two different annihilations are detected by two detectors at essentially the same time. For example, assuming two gamma rays are detected at the same time from two different annihilations, the coincidence circuitry cannot determine which detection correspond to a first annihilation and which detection correspond to a second annihilation. The two annihilations that randomly occur at the same time are recorded at a third unrelated location.

Error due to both dead time and randoms should be corrected to provide the highest quality image. To this end, typically, the processor counts dead time errors and randoms and, at the end of an acquisition period and prior to reconstructing an image from the collected data, corrects acquired data. Other common sources of error include attenuation of the gamma rays by different portions of a patient's body and detector gain nonuniformities.

While long acquisition periods (e.g. 20 minutes) are required to generate data needed to reconstruct high resolution and high quality images, long acquisition periods have a number of shortcomings. First, the half life of typical medical grade radiopharmaceuticals is relatively short so that, even during an acquisition period, the rate of gamma ray emissions changes appreciably. The fact that emission rates change over time coupled with errors due to dead time and randoms means that the number of detection errors decreases during the course of an acquisition period. For example, where a detector pair might cause 1000 errors during a first imaging second, the pair may cause only 975 errors during the second imaging second and only 948 errors during a third imaging second and so on. While error correction at the end of a long period does improve image quality, quality can be further improved if errors which occur during shorter time intervals are used to correct data collected during the specific time intervals.

Second, during data acquisition an organ of interest must remain completely still. Any movement of the organ of interest within the imaging area causes data generated before and after the movement to misalign, thus generating a "blur" in a resulting image. Clearly, long acquisition periods increase the likelihood of patient (i.e. organ of interest) movement.

Third, data which is collected over a long period cannot show dynamic occurrences within an organ of interest. For example, often it is desirable to observe how a liquid doped with a radiopharmaceutical travels through a vessel or the rate at which an organ of interest accumulates a radiopharmaceutical, not just the total amount. Unfortunately long acquisition periods do not yield data which has a temporal component. In other words, after acquisition there is no way to distinguish detected annihilations which occurred during a specific acquisition period time interval from annihilations which occurred during other acquisition period time intervals.

Fourth, data which is collected over a long period cannot be displayed in real time during data acquisition. The ability to acquire imaging data over shorter acquisition periods enables the reconstruction and display of a scout image to observe the accumulation of a tracer in real time.

In addition, a system which facilitates observation of dynamic occurrences would be advantageous for determining when radiopharmaceutical concentration within an organ of interest has reached a level required for imaging data acquisition so that a high resolution acquisition period can begin. For example, when a radiopharmaceutical which is to become concentrated in a patient's brain is first injected into the patient, it often takes some time before concentration within the brain occurs. The time required for concentration to occur varies in part on the physiological make up of the patient and therefore, the ideal time for starting an acquisition period varies from patient to patient. In this case a system which facilitates collection of data for generating fast dynamic frames would be useful to detect the bolus of activity as a radiopharmaceutical enters a brain. The bolus of activity can then be used to estimate the best time to start acquiring high resolution data.

To address the problems discussed above, the industry has developed several solutions. For example, in order to generate annihilation detection data which has a temporal component, the acquisition period can be divided into several consecutive time intervals and a separate set of acquisition data for each interval can be generated and stored. Then consecutive data sets can be compared to identify dynamic occurrences and also can be added together to provide data for forming a high resolution image.

Theoretically, consecutive acquisitions could also be used to more accurately correct data for errors due to dead time and randoms. To this end, at the end of each time interval counted errors may be used to correct data acquired during the time interval.

Consecutive acquisitions may also be used to correct data for patient movement. To this end, after an acquisition period, the processor can compare consecutive data to identify movement. When movement occurs, the processor may modify the later acquired data to compensate for the perceived movement. In the alternative, if excessive movement occurred during a single time interval the processor may disregard the blurred data thereby reducing error. At the end of the long acquisition period, the processor may add up the corrected data sets to generate a single data set for constructing an image.

Unfortunately, while the consecutive acquisition solution can be applied in some creative ways to eliminate most of the problems described above, the consecutive acquisition solution has one primary shortcoming, required memory. As indicated above, for every separate data set acquired, the camera system requires 25 Mb of memory. Additional memory is also required to store error data. While 25 Mb of memory is not a problem where only a single data set is acquired, if a separate data set is required each second of an acquisition period, a huge and impractical amount of memory is required. Thus, while this solution can theoretically be employed, this solution is simply to complex and therefore expensive for many applications.

Another solution would be to store only two 25 Mb data sets at any instant during an acquisition and perform correction processes on collected data in real time. For example, during a first second of an acquisition period a first 25 Mb data set could be collected and stored along with detected errors. The first data set could be immediately corrected to compensate for the errors generating a corrected first data set. During a second of the period a second 25 Mb data set could be collected and stored along with detected errors. The second data set could be immediately corrected to compensate for the errors generating a corrected second data set. Then, the corrected second and first data sets could be compared to determine if any movement occurred. Where movement occurred, the second data set could be modified to compensate for the perceived movement generating a modified second set. Thereafter, the corrected first set and modified second set could be added to form a cumulative corrected data set. The cumulative data set could then be stored as the corrected first data set for future comparison to other corrected data sets. Next, a next consecutive 25 Mb data set could be collected along with detected errors and written over the second corrected data set and associated errors in memory. Again, the next consecutive data set would be corrected, compared to the corrected first data set (i.e. the cumulative data set) for movement and modified accordingly if necessary. Thus, all corrections could be performed essentially in real time during acquisition.

While this solution is theoretically possible and has many advantages, this solution is impractical because the computing power required to perform all of the functions described above in real time cannot practically be implemented.

Another solution to correct for patient movement uses a position sensing device such as a camera or a proximity sensor to determine when a patient has moved. To aid in detection an identifiable mark may be placed on the patient's skin which is recognizable by the sensing device. When movement is detected, the detector causes a new annihilation detection acquisition to begin and records data which defines the perceived movement. After an entire acquisition period is completed, the processor compensates the second set of acquired data for the perceived movement and adds the two sets of data together prior to constructing an image.

While this position sensing solution is useful, this solution requires a relatively complex sensing system which can precisely identify three way patient movement. In addition, while this solution can correct for patient movement, this solution does not address the other problems indicated above, namely correction of acquisition errors and facilitating observation of dynamic occurrences.

BRIEF SUMMARY OF THE INVENTION

An exemplary embodiment of the invention includes a method for, during a medical imaging data acquisition period, collecting data at least two different resolutions including at least one high resolution and one low resolution. The low resolution data is periodically collected as separate low resolution data sets for observation and comparison purposes and can be used to correct various errors in the high resolution data set or to signal the need to start a new high resolution acquisition. The high resolution data set is primarily used to generate a diagnostic quality image for physician review.

Advantageously, the low resolution data sets provide sufficient data for identifying patient and organ of interest movement and therefore can be used to determine when an organ of interest has been shifted. In addition, advantageously, the low resolution data is a relatively small data quantity which can be compared in real time using a standard off the shelf processor, so that organ shift can be identified when a shift occurs. When a shift occurs, a new high resolution data set can be formed which corresponds to the new position of the organ of interest. After a complete acquisition period the two (or more, depending on the number of detected shifts) high resolution data sets can be modified to eliminate the effects of the shift, thereby providing a highly accurate set of high resolution data.

To this end, the invention includes a method for use with a medical imaging system and a tracer substance, the tracer substance positioned within an organ to be imaged which is positioned within an imaging area, the substance generating sub-atomic particles which emanate therefrom. The system includes at least one camera and a processor, the camera including a plurality of adjacent detector sets and positioned adjacent the imaging area, each detector set including a plurality of adjacent detectors, each detector detecting emanating particles and providing a pulse to the processor for each particle detected. The inventive method comprising the steps of, during each sub-period, for each detector subset, counting the pulses generated by the subset detectors and storing the subset pulse counts as the low resolution acquisition data set associated with the sub-period and during a high resolution period, for each detector, counting all of the pulses generated by the detector and storing the detector pulse counts as the high resolution aquisition data set.

The present invention has a number of advantages. One advantage of the invention is that the invention generates two different data sets during an aquisition period wherein one data set is a high resolution data set and the other set is a low resolution data set. It has been recognized that, while high resolution data required for generating diagnostic quality images must be characterized by extremely high resolution, relatively lower resolution data can be used for many other applications including identifying organ of interest movement, identifying dynamic physiological occurrences and correcting data collection errors which have a temporal nature. Thus, two resolution data is extremely important.

In one embodiment the aquisition period is divisible into time intervals, each time interval consists of one sub-period and a remainder period. In this embodiment, the high resolution period includes all of the remainder periods. The high resolution period may consist of all remainder periods and not include the sub-periods or, in the alternative, may include the entire aquisition period. In addition, the sub-period may be less than or equal to the duration of a time interval.

Thus, the data collected to form the low resolution data sets may be used exclusively for forming the low resolution data sets or may also be used to enhance the high resolution data set. Where the data used for generating the low resolution data set is exclusively used to generate low resolution data a relatively simple processor which routes collected data to one location can be employed at the expense of reducing the overall total high resolution data set. However, where the data used to generate the low resolution data set is also used to enhance the high resolution set, a larger high resolution set results at the expense of a relatively more complex processor which can count both periods simultaneously. Either option is advantageous and both are contemplated by the present invention.

The invention also contemplates a method for determining when an organ of interest shifts within the imaging area and further includes the steps of, beginning with the second low resolution data aquisition set, comparing consecutive low resolution data aquisition sets and, when consecutive low resolution data aquisition sets are appreciably different, indicating that a shift has occurred.

Preferably the method is also for causing a new high resolution data aquisition when it is perceived that the organ of interest has shifted. To this end the method further includes the steps of, after a shift has been indicated, storing subsequent high resolution data as a separate high resolution data set.

Thus, another advantage of the invention is that the invention facilitates a real time comparison of data for determining when an organ of interest has shifted during an aquisition period and then taking measures to eliminate data errors which result from the organ shift. To this end, when a shift occurs, the inventive method causes a split in high resolution data so that data collected after the shift is separate from data collected before the shift. Then, after an aquisition period, the different sets of high resolution data can be modified so that the data aligns without substantial error.

The invention also provides a system wherein data collecting errors due to dead time, randoms, attenuation and detector nonuniformities is corrected accurately. To this end, according to the present invention, low resolution data is collected during each separate high resolution data aquisition and is used to correct the high resolution data set. Thus, errors perceived during collection of a first high resolution data set are used to correct the first high resolution set, errors perceived during collection of a second high resolution data set are used to correct the second high resolution set and so on. The result is more accurate correction and a better overall image.

The invention also provides a method for use with a PET system to reduce required memory space for storing data needed to provide a high resolution image which is compensated for various data acquisition errors and patient movement. The inventive method is particularly suitable for PET systems as the amount of data required to generate a PET image which is corrected for error due to aquisition and organ motion is enormous. By using low resolution data for motion detection memory requirements are substantially reduced.

DETAILED DESCRIPTION OF THE INVENTION

I. Hardware

Figure 1:
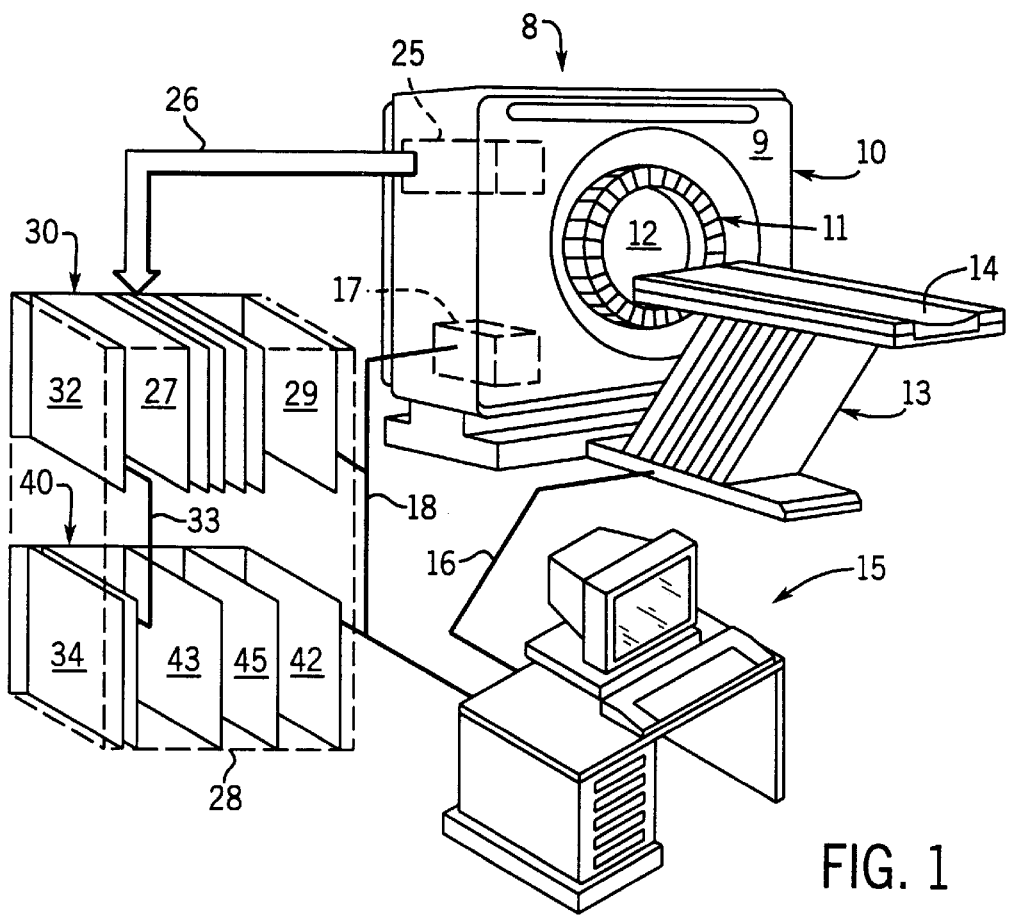
FIG. 1 pictorial view with parts cut away of a PET scanner system which employs the present invention.

Referring now to the drawings, wherein like reference characters and symbols represent corresponding elements and signals throughout the several views, and more specifically referring to FIG. 1, the present invention will be described in the context of an exemplary PET scanner system 8. System 8 includes an acquisition system 10, an operator work station 15, a data acquisition processor 30 and an image reconstruction processor 40.

System 10 includes a gantry 9 which supports a detector ring assembly 11 about a central bore which defines an imaging area 12. A patient table 13 is positioned in front of gantry 9 and is aligned with imaging area 12. A patient table controller (not shown) moves a table bed 14 into imaging area 12 in response to commands received from work station 15 through a serial communications link 16.

A gantry controller 17 is mounted within gantry 9 and is responsive to commands received from operator work station 15 through a second serial communication link 18 to operate gantry 9. For example, gantry 9 can be tilted away from vertical on command from an operator, can perform a "transmission scan" with a calibrated radio nuclide source to acquire attenuation measurements, can perform a "coincidence timing calibration scan" to acquire corrective data, or can perform a normal "emission scan" in which positron annihilation events are counted.

Figure 2:
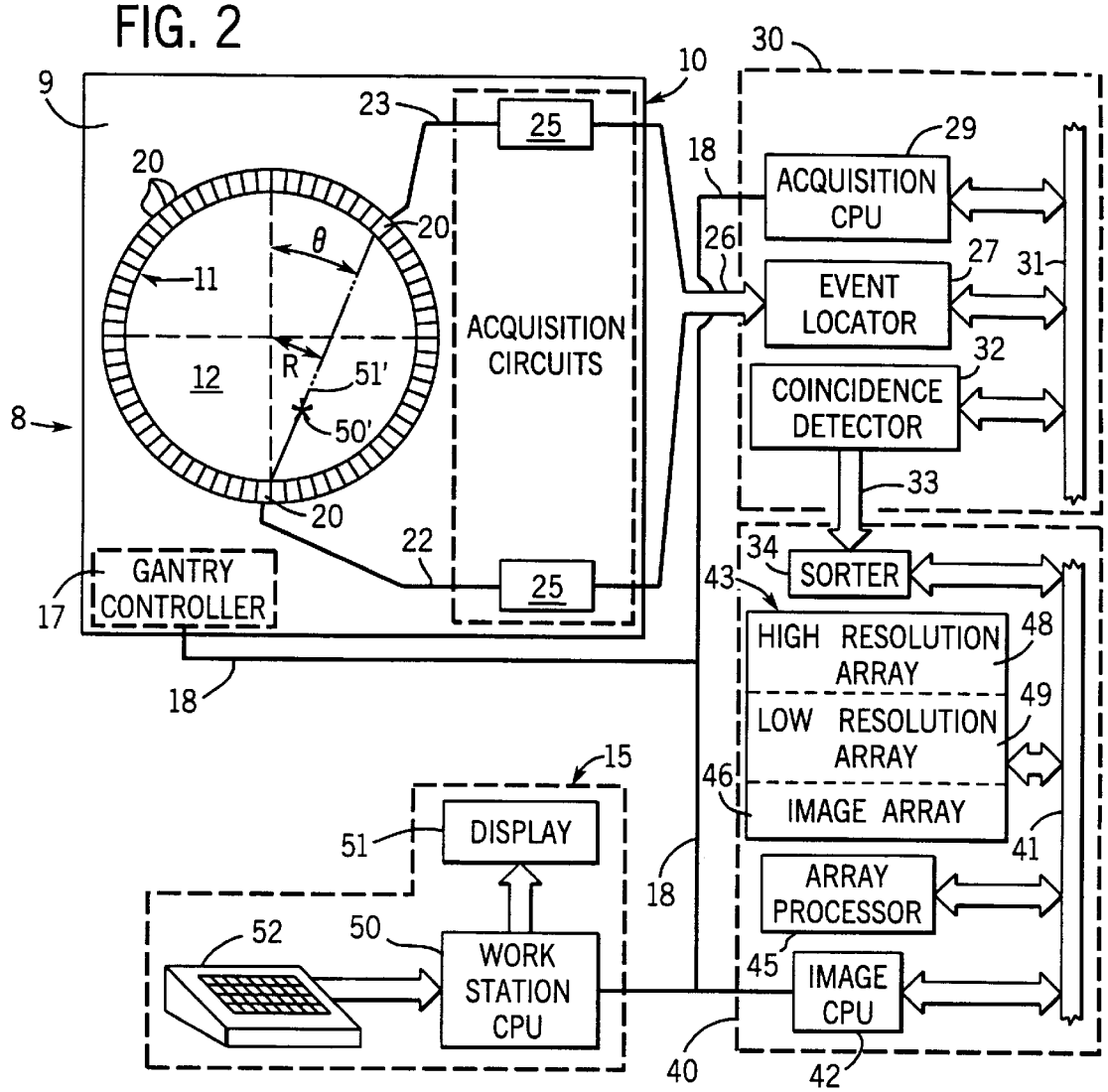
FIG. 2 a schematic diagram of the PET scanner system of FIG. 1.
Figure 3:
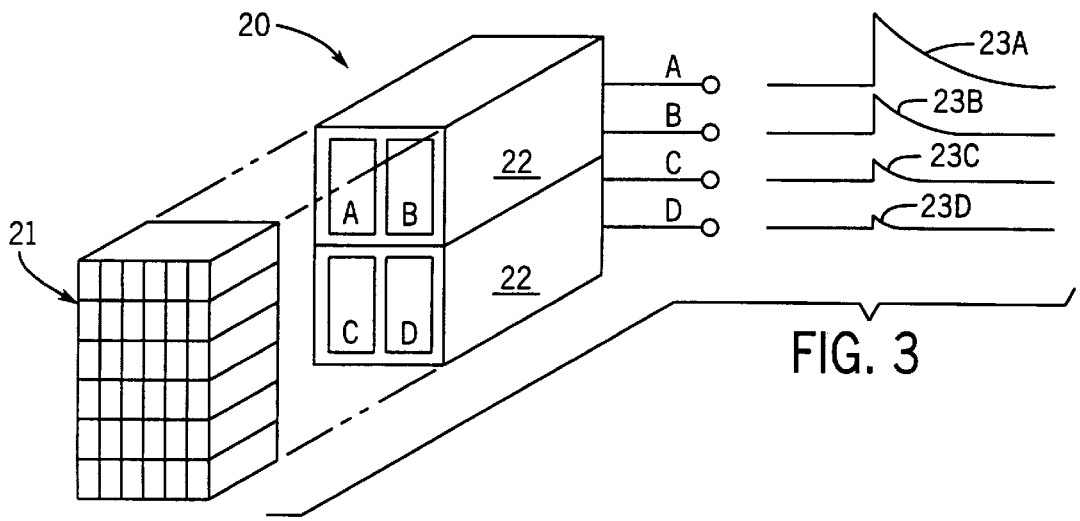
FIG. 3 a pictorial view of a detector module which forms part of the PET scanner stem of FIG. 1.

As shown best in FIGS. 2 and 3, detector 11 is comprised of a large number of detector blocks 20. Each block 20 includes a set of bismuth germinate (BGO) scintillator crystals 21 arranged in a 6×6 matrix and disposed in front of four photo multiplier tubes (PMTs) 22. Each PMT 22 produces an analog signal 23A–23D which arises sharply when scintillation event occurs then tails off exponentially with a time constant of 300 nanoseconds. The relative magnitudes of the analog signals 23A–23D is determined by the position in the 6×6 BGO matrix at which a scintillation event takes place, and the total magnitude of these signals is determined by the energy of a gamma ray which causes the event.

A set of acquisition circuits 25 are mounted within gantry 9 to receive the four signals 23A–23D from each module 20 in detector 11. Acquisition circuits 25 determined x and y event coordinates within the block of BGO crystals 21 by comparing the relative signal strengths as follows:

$$x=(A+C)/(A+B+C+D) \tag{1}$$

$$z=(A+B)/(A+B+C+D) \tag{2}$$

These coordinates (x,z), along with the sum of all four signals (A+B+C+D) are then digitized and sent through a cable 26 to an event locator circuit 27 housed in a separate cabinet 28. Each acquisition circuit 25 also produces an event detection pulse (EDP) which indicates the exact moment the scintillation event took place.

Referring particularly to FIGS. 1 and 2, event locator circuits 27 form part of a data acquisition processor 30 which periodically samples the signals produced by the acquisition circuits 25. The processor 30 has a backplane bus structure 31 which conforms with the VME standard, and an acquisition CPU 29 which controls communications on bus 31 and links processor 30 to the local area network 18.

Event locator 27 is comprised of set of separate circuit boards which each connect to cable 26 and receive signals from corresponding acquisition circuits 25 in gantry 9. Locator circuits 27 synchronizes an event with operation of processor 30 by detecting the event pulse (EDP) produced by an acquisition circuit 25, and converting it into an 8-bit time marker which indicates when within a current 250 nanosecond sample period the scintillation event took place. Also, locator 27 discards any detected events if the total energy of the scintillation is outside the range of 511 keV±20%.

During each 250 nanosecond sample period, the information regarding each valid event is assembled into a set digital numbers that indicate precisely when the event took place and the position of the BGO crystal 21 which detected the event. As indicated above, for the purposes of the present invention, it will be assumed that there are 12,00 separate BGD detectors or crystals 21. Event data packets are conveyed to a coincidence detector 32 which is also part of processor 30.

Coincidence detector 32 accepts the event data packets from locator circuits 27 and determines if any two events are in coincidence. Coincidence is determined by a number of factors. First, the time markers in each event data packet must be within 12.5 nanoseconds of each other, and second, the locations indicated by the two event data packets must lie on a straight line which passes through the field of view (FOV) in imaging area 12. Events which cannot be paired as coincidence events are discarded, but coincidence event pairs are located and recorded as a coincidence data packet that is conveyed through a serial link 33 to a sorter 34. Each coincidence data packet includes a pair of digital numbers which precisely identify the addresses of the two BGO crystals 21 that detected the event.

Sorter 34 is a circuit which forms part of an image reconstruction processor 40. Processor 40 is formed about a backplane bus 41 which conforms to the VME standards. An image CPU 42 controls the backplane bus 41 and links processor 40 to local network 18. A memory module 43 also connects to backplane 41 and it stores the data used to reconstruct images as will be described in more detail below. An array processor 45 also connects to the backplane 41 and operates under the direction of image CPU 42 to perform the image reconstruction using data in memory module 43. The resulting image array 46 is stored in memory module 43 and is output by image CPU 42 to operator work station 15.

The primary purpose of sorter 34 is to generate memory addresses for the packets to efficiently store coincidence data. The set of all projection rays that point in the same direction (θ) and pass through the scanner's field of view is a complete projection, or "view". A distance R between a particular projection ray and a center of the field of view locates that projection ray within the field of view. As shown in FIG. 2, for example, a positron annihilation (hereinafter an "event") 50' occurs along a projection ray 51' which is located in a view at the projection angle θ and the distance R. The sorter 34 counts all of the events that occur on this projection ray (R, θ) during an acquisition period by sorting out the coincidence data packets that indicate an event at the two BGO detector crystals lying on ray 51'.

During a data acquisition, the coincidence counts are organized in memory 43 as a set of two-dimensional arrays, one for each axial image, and each having as one of its dimensions the projection angle θ and the other dimension the distance R. This θ by R map of detected events is called a histogram, or more commonly a sinogram array 48. Array 48 is referred to hereinafter as a high resolution array 48.

Coincidence events occur at random and the sorter 34 quickly determines the θ and R values from the two crystal addresses in each coincidence data packet and increments the count of the corresponding sinogram array element. The values of θ and R may be calculated as follows, although in the preferred embodiment these are converted to memory addresses as will be described in detail below:

$$\theta = (\phi2 + \phi1)/2 + 90° \quad (3)$$

$$R = r_0 \cos[\phi2 - \phi1)/2] \quad (4)$$

where

φ1=angular orientation of the first detector crystal;

φ2+=angular orientation of the second detector crystal;

$r_0$=radius of detector ring.

At the completion of an acquisition period, memory 43 stores the total number of annihilation events which occurred along each ray (R, θ) in sinogram 48. As in the background section above, hereinafter it will be assumed that the system described above is capable of distinguishing between 25 million different "meaningful" detector pairs (i.e. different rays (R, θ)) and therefore, for every separate high resolution data acquisition which is performed, a 25 Mb block of memory space has to be set aside.

Array processor 45 reconstructs an image from data in array 48. First, however, a number of corrections are made to the acquired data to correct for measurement errors such as those caused by attenuation of the gamma rays by the patient, detector gain nonuniformities, randoms and integrator dead time. Each row of the corrected sinogram array is then Fourier transformed by the array processor 45 and multiplied by a one-dimensional filter array. The filtered data is then inverse Fourier transformed, and each array element is backprojected to form an image array 46. The image CPU 42 may either store the image array data on disk or tape (not shown) or output the image array to work station 15.

Station 15 includes a CPU 50, a CRT display 51 and a keyboard 52. CPU 50 connects to network 18 and it scans the key board 52 for input information. Through the keyboard 52 and associated control panel switches, an operator can control calibration of the system 9, its configuration, and the positioning of patient table 13 during an acquisition period.

II. Acquired Data Binning

A. Interleaved Periods

In addition to efficiently selecting memory space for storing coincidence data, according to the present invention, sorter 34 has a second "resolution control" purpose. Sorter 34 is used to control resolution of data which is collected via system 9 and processor 30 for storage. To this end, there are some applications which do not require extremely high resolution data. For example, patient movement can be identified by comparing relatively low resolution data. In addition, some dynamic occurrences such as bolus activity entering a brain can be monitored using low resolution data. Moreover, when patient movement is identified, sorter 34 can split high resolution data acquisition into separate data sets, one set before movement and one set after movement. After an acquisition period, either the image CPU 42 or the array processor 45 can correct for error due to patient motion in the second data set. Similarly, error due to dead time, randoms detector variance and patent attenuation can be compensated.

According to the present invention, using station 15 an operator can select any of several different data acquisition schemes for dynamically modifying data resolution during data acquisition. For example, during periods when low resolution data is acceptable and selected, sorter 34 groups all similarly positioned detector pairs within a single field of view (i.e. characterized by the same angle θ) in a single detector set, storing annihilation detection data together for the entire set. For instance, detector pairs may be grouped into sets of 25,000. Where each detector set includes 25,000 detector pairs, during an acquisition, instead of having to store 25 Mb of data, only one kilobyte (Kb) needs to be stored. While it is contemplated that other resolutions may be selected via station 15, for the purposes of this explanation it will be assumed that acquisitions are performed at only two different resolutions, high resolution and the resolution which corresponds to the case where detector sets include 25,000 detector pairs. This later resolution will be referred to hereinafter as "low resolution".

Low resolution data is stored in the same manner as high resolution data, having R and θ coordinates, the only difference being that there is much less low resolution data than there would be high resolution data and therefore a much smaller amount of memory is required. Referring still to FIG. 2, low resolution data from a plurality of acquisition periods (i.e. a separate data set for each acquisition) is stored in memory 43 in low resolution array 49.

Figure 5:
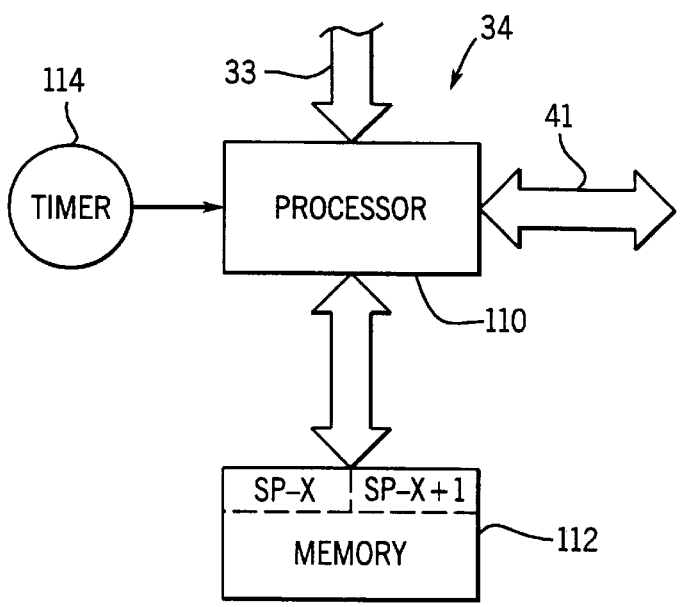
FIG. 5 is schematic diagram of the sorter of FIG. 2.

Referring to FIG. 5, sorter 34 includes a sorter processor 110 a sorter memory 112 which is accessible to processor 110 for storage and retrieval of data, and a timer 114.

Figure 4:
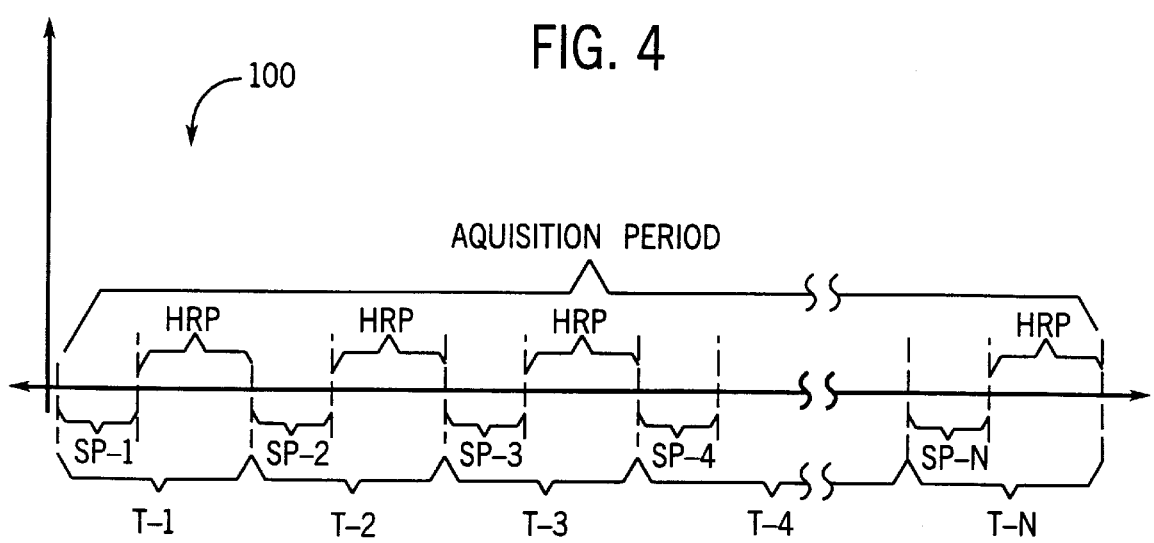
FIG. 4 is a timing diagram illustrating operation of a first inventive method.

Referring now to FIG. 4, a timing diagram 100 is provided which illustrates a first embodiment of the present invention. A relatively long acquisition period is illustrated which has been divided into N equal length time intervals T-1 through T-N. While only a small number of time intervals T-N is illustrated, preferably, there are a large number of intervals. For example, where the acquisition period constitutes 20 minutes and each interval T-1 through T-N is one second, there may be 1200 intervals (i.e. N=1200).

In addition, each time interval is divided into two separate periods including a low resolution sub-period and a high resolution or remainder period. For example, referring to interval T-1, interval T-1 is divided into sub-period SP-1 which comprises the first part of interval T-1 and a following high resolution sub-period HRP which comprises the second part of interval T-1. Similarly, interval T-2 is divided into sub-period SP-2 and a high resolution period HRP, and so on.

According to this embodiment of the invention, processor 110 tracks periods SP-1 through SP-N and periods HRP via timer 114. During each sub-period SP-1, SP-2 . . . SP-N, processor 110 selects low resolution data storage and during each high resolution sub-period HRP processor 110 selects high resolution data storage. In addition, processor 110 stores data collected during each sub-period SP-1 through SP-N separate from data collected during other sub-periods so that there are N separate low resolution data sets, each set stored in array 49. Moreover, processor 110 combines data collected during all high resolution periods HRP to generate at least one high resolution data set, the high resolution set stored in array 48.

B. Interleaved Periods with Multiple High Resolution Data Sets

In addition to performing as described above to generate low resolution data and high resolution data in an interleaved fashion, processor 110 may also provide some real time processing for identifying patient movement. To this end, sorter memory 112 is capable of simultaneously storing two consecutive low resolution data sets SP-X and SP-X+1 at a single time. Processor 110 always stores the most recent low resolution data set SP-X in its memory. In addition, when a new low resolution set SP-X−1 is generated, processor 110 stores that set in memory 112.

Starting with the second low resolution data set generated by processor 110 during an acquisition period, each time a new low resolution set is formed by processor 110, processor 110 compares the new low resolution set to the previous set which is stored in memory 112. This comparison may involve intensive processing including image reconstruction and analytic techniques such as object recognition and registration. For example, where a first low resolution set is stored at SP-X and a new low resolution data set is stored at SP-X+1, processor 110 compares the sets at SP-X and SP-X+1. Where there are substantial changes between the new and previous sets, processor 110 recognizes that the organ of interest has shifted and, at the very least, sets a flag $\zeta_1$ indicating that a new high resolution data set should be generated thereafter. Flag $\zeta_1$ is used by processor 110 as will be explained in more detail below.

Figure 7:
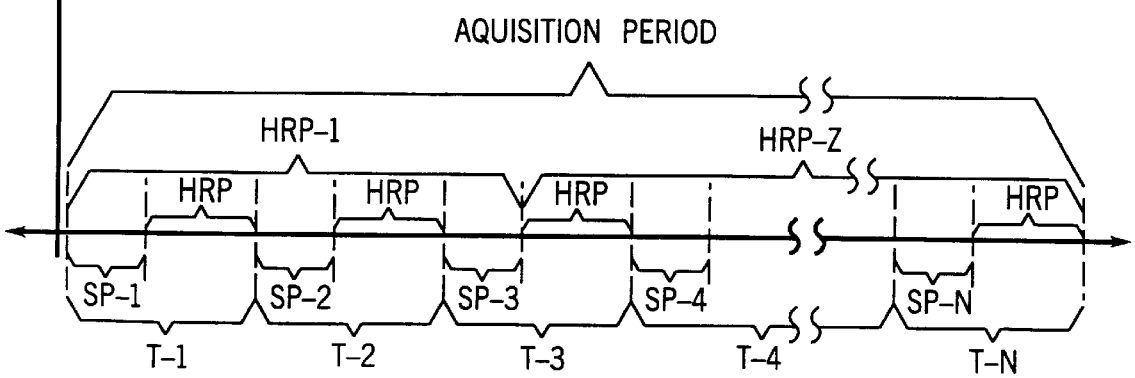
FIG. 7 a timing diagram similar to FIG. 4 illustrating a second embodiment of the present invention.

Referring to FIG. 7, when flag $\zeta_1$ is not set (i.e. no organ shift has been perceived and no metabolic uptake rate has changed), during every high resolution period HRP, processor 110 adds each acquired high resolution data set to a combined data set which corresponds to the sum of all previous high resolution sets since the last time flag $\zeta_1$ was set thereby generating a single updated combined high resolution data set. For example, if low resolution data sets corresponding to periods SP-1 and SP-2 are similar such that processor 110 does not perceive a shift and flag $\zeta_1$ is not set, when the data set corresponding to the second period HRP (i.e. HRP during interval T-2) is generated, processor 110 adds the new data set to the set corresponding to the first period HRP (i.e. HRP during interval T-1) thereby generating the combined data set HRP-1. Similarly, if low resolution data sets corresponding to periods SP-2 and SP-3 are similar such that processor 110 does not perceive a shift and flag $\zeta_1$ is not set, when the data set corresponding to third period HRP (i.e. HRP during interval T-3) is generated, processor 110 adds the new data set to the previously combined set thereby generating an updated combined data set HRP-1.

However, if low resolution data sets corresponding to periods SP-2 and SP-3 are dissimilar such that processor 110 perceives a shift and flag $\zeta_1$ is therefore set, when the data set corresponding to the third period HRP is generated, processor 110 clears flag $\zeta_1$ and starts a second high resolution data set which will include the sum of all subsequent high resolution data sets until either the end of the acquisition period or flag $\zeta_1$ is again reset due to a subsequent perceived patient motion.

Referring still to FIGS. 2 and 7, after the acquisition period, sorter 34 will have stored a separate data set for each low resolution sub-period SP-1 through SP-N and at least one and perhaps several different high resolution data sets, the number of high resolution sets depending on the number of perceived movements of the organ of interest during the acquisition period. For example, if there were three perceived organ of interest movements, four high resolution data sets would be generated, a first set prior to the first movement, a second set between the first and second movements, a third set between the second and third movements and a fourth set between the third movement and the end of the acquisition period.

After the acquisition period, array processor 45 can correct each high resolution data set for errors due to dead time, randoms, attenuation and detector non-uniformities. Then, processor 45 can compensate each high resolution data set for perceived movements. For example, by comparing the first and second high resolution data sets processor 45 may determine that, in the second set, the organ of interest had shifted two centimeters to the right. In this case the second high resolution date set is compensated by effectively shifting the set to the left by 2 centimeters so that the first and second sets match in space. Although this explanation of corrective measures is a simplification of the mathematics involved in spatial correction, it should suffice to indicate the general process. Many spatial correction algorithms are well known in the art and any can be used with the present invention.

Referring again to FIG. 7, sub-periods SP-1 through SP-N are shown as being relatively large portions of intervals T-1 through T-N, respectively only for explanation purposes. In reality, where each time interval T-1 through T-N is one second, each sub-period SP-1 through SP-N is a small fraction of a second (e.g. 1/100th of a second). In this manner 99% of all gathered data is preserved for constructing high resolution images.

Hence, it should be appreciated that by generating two different resolutions of data sets during a data acquisition period many different advantages result.

Importantly, by using low resolution data set instead of high resolution sets, memory required for data acquisition is appreciably reduced. For example, instead of storing 1200 25 Mb data sets, one 25 Mb set for each second in a 20 minute acquisition period, where sorter 34 groups adjacent sets of 25,000 detector pairs together for low resolution data generation, each low resolution set requires 1 kilobyte of memory for storage, all 1200 low resolution sets requiring only 1.2 Mb of memory. This clearly amounts to an appreciable reduction in required memory.

In addition, because each low resolution data set is relatively small, real time data comparison can be facilitated using inexpensive off the shelf processors. Thus, while it is impractical to compare consecutive 25 Mb high resolution data sets during data acquisition to identify organ shifts, it is easily feasible to compare consecutive 1 Kb low resolution data sets to identify shifts.

Moreover, while there are some applications where low resolution data sets serve no purpose after a comparison to perceive organ movement, other applications may still require low resolution data after an acquisition period. For example, a physician may wish to independently confirm that patient movement (i.e. organ shifts) occurred at specific times. In addition, a physician may wish to use low resolution data sets to study dynamic physiological occurrences.

C. Overlapping Periods

Figure 8:
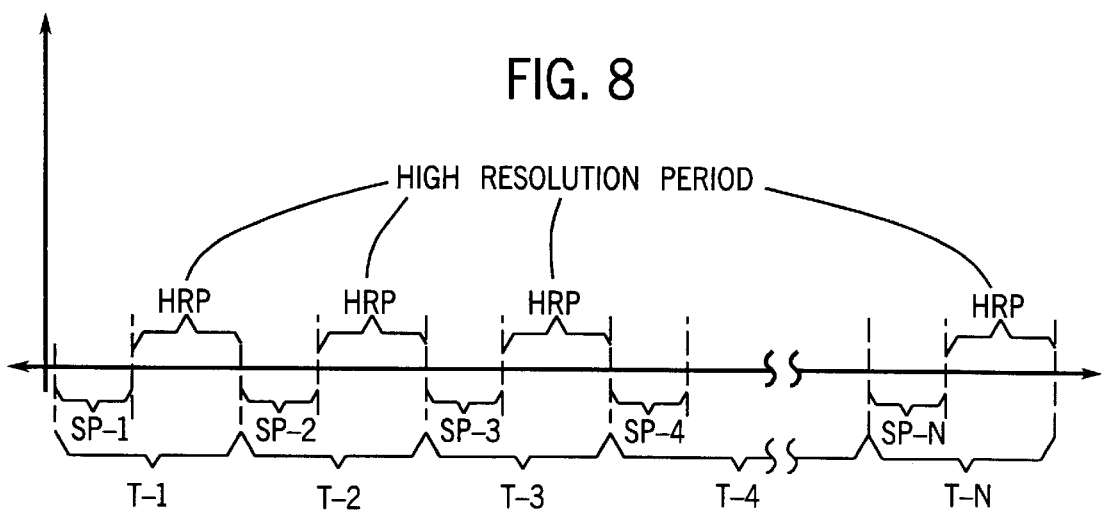
FIG. 8 is a timing diagram similar to FIG. 4, albeit showing a different relationship between periods.
Figure 9:
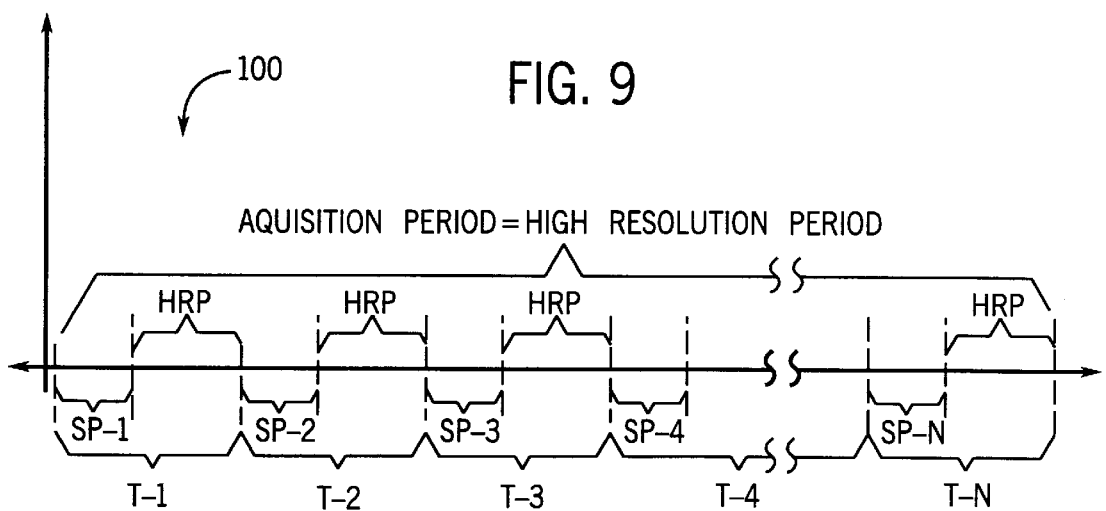
FIG. 9 is a timing diagram similar to FIG. 4, albeit showing a different relationship between periods.
Figure 10:
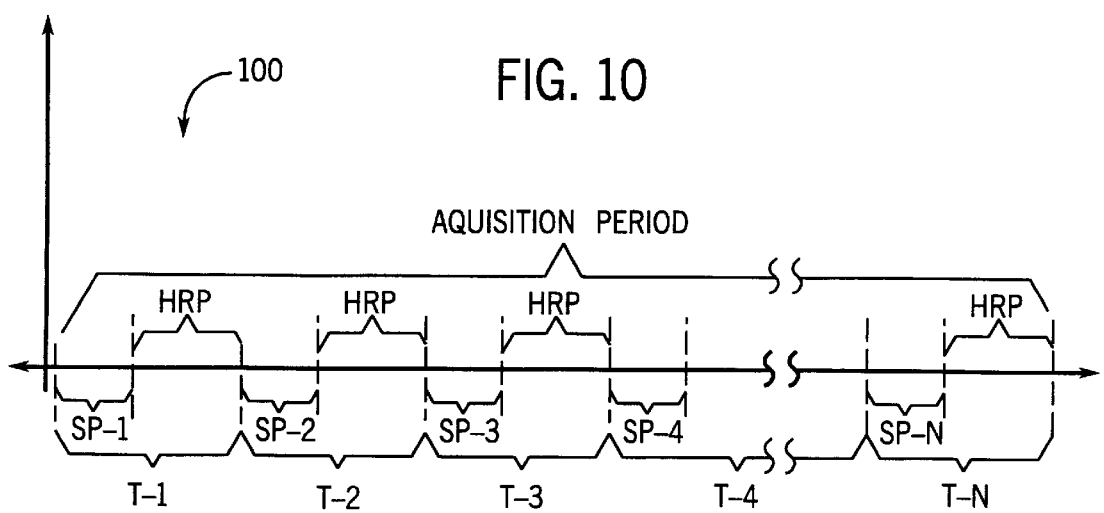
FIG. 10 is a timing diagram similar to FIG. 4, albeit showing a different relationship between periods.

Referring now to FIG. 8 the high resolution period during which data is gathered for high resolution imaging may include all of the remainder periods HRP. In addition, referring to FIG. 9 the high-resolution period during which data is gathered to generate the high resolution image may correspond to the entire acquisition period. Moreover, referring to FIG. 10 each one of the low resolution sub-periods SP-1, SP-2, etc., while described above as being short, may in fact be equal in length to a corresponding time interval T-1, T-2, etc.

Figure 6:
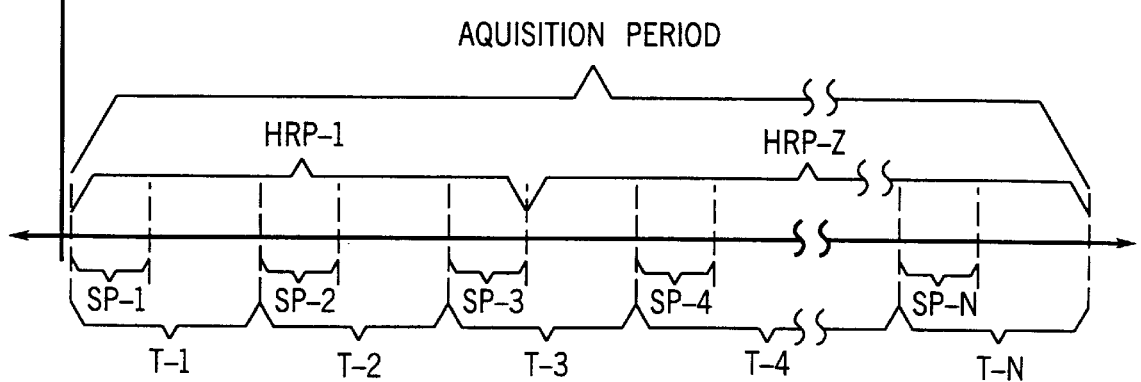
FIG. 6 a timing diagram similar to FIG. 4 illustrating a third embodiment of the present invention.

Referring to FIG. 6, a timing diagram 130 is provided which illustrates a third embodiment of the present invention. Here, as in the first embodiment (see FIG. 4) a relatively long acquisition period is illustrated which has been divided into N equal length time intervals T-1 through T-N where N is assumed, for the purposes of this explanation, to be 1200.

In the third embodiment, a separate sub-period SP-1 through SP-N is identified as a first portion of each interval T-1 through T-N and is typically of a relatively short duration (e.g. 1/100th of a second).

This third embodiment is different than the first embodiment in that all gathered data, including data gathered during sub-periods SP-1 through SP-N is stored for creating a high resolution image. In addition, data during periods SP-1 through SP-N is used, as in the second embodiment, to identify patient and organ of interest movement. To this end, referring also to FIGS. 2 and 5, sorter processor 110 is capable of performing two different processes on data received during each of sub-periods SP-1 through SP-N. First, data during sub-periods SP-1 through SP-N is routed to high resolution array 48. Second, data during each sub-period SP-1 through SP-N is again grouped into low resolution data sets.

Once again, when organ movement is perceived, processor 110 divides high resolution data into two different high resolution data sets. For instance, referring to FIG. 6, it is assumed that during the first two time intervals (i.e. T-1 and T-2) no organ movement occurs. Therefore, during intervals T-1 and T-2 processor 110 stores all collected high resolution data as a first high resolution data set HRP-1. However, if movement occurs just prior to the beginning of interval T-3, the low resolution set corresponding to sub-period SP-3 will be different than the low resolution set corresponding to sub-period SP-2. In this case, processor 110 starts a new high resolution data set HRP-2 which corresponds to the new organ of interest position. After the acquisition period, array processor 45 can correct for organ shift and other perceived data errors to provide a single, extremely accurate, high resolution data set for constructing an image of the organ of interest.

This third embodiment is particularly advantageous in that virtually all acquired data is used to form the high resolution image thereby generating a more accurate image.

D. Minimal Low Resolution Periods

According to yet a fourth embodiment of the invention, it has been recognized that, in some applications, low resolution data sets are not required after an initial comparison of consecutive data sets to identify organ shift. Therefore, according to the fourth embodiment of the invention, instead of storing low resolution data sets, after two data sets have been compared, to identify shift the earliest of the sets is discarded and the later of the sets remains in sorter memory 112 (see FIG. 5) for comparison to the next low resolution data set. In this manner, referring also to FIG. 2, low resolution array 49 can be eliminated.

To apprise the public of the scope of this invention, we make the following claims:

What is claimed is:

1. A method for use with a medical imaging system and a tracer substance, the tracer substance positioned within an organ to be imaged which is positioned within an imaging area, the substance generating sub-atomic particles which emanate therefrom, the system including at least one camera and a processor, the camera including a plurality of adjacent detector sets and positioned adjacent the imaging area, each detector set including a plurality of adjacent detectors, each detector detecting emanating particles and providing a pulse to the processor for each particle detected, the method for, during an acquisition period that comprises sub-periods, generating at least one high resolution data acquisition and, during each sub-period, generating a unique low resolution data acquisition, the method comprising the steps of:

during each sub-period, for each detector subset, counting the pulses generated by the subset detectors and storing the subset pulse counts as the low resolution acquisition data set associated with the sub-period; and during a high resolution period, for each detector, counting all of the pulses generated by the detector and storing the detector pulse counts as the high resolution acquisition data set.

2. The method of claim 1 wherein the acquisition period is divisible into time intervals, each time interval including one sub-period and a remainder period, the high resolution period including all of the remainder periods.

3. The method of claim 2 wherein the high resolution period consists of all of the remainder periods.

4. The method of claim 2 wherein the high resolution period includes the entire acquisition period.

5. The method of claim 2 wherein each sub-period has a duration which is less than a time interval.

6. The method of claim 2 wherein each sub-period is a time interval.

7. The method of claim 1 also for determining when the organ to be imaged shifts within the imaging area, the method comprising the steps of, beginning with the second low resolution data acquisition set, comparing consecutive low resolution data acquisition sets and, when consecutive low resolution data acquisition sets are appreciably different, indicating that a shift has occurred.

8. The method of claim 7 also for causing a new high resolution data acquisition when it is perceived that the organ to be imaged shifted, the method further including the steps of, after a shift has been indicated, storing subsequent high resolution data as a separate high resolution data set.

9. The method of claim 1 wherein the camera is a positron emission detecting camera wherein emitted particles are grouped in particle pairs, each particle pair is detected by opposing detector pairs and the processor includes coincidence circuitry for identifying particle pairs which are detected by detector pairs, detector sub-sets include proximate detector pairs which are disposed in a single camera view and the step of counting detector sub-set pulses includes counting coincident detector pair pulses corresponding to the detector pair subset while the step of counting detector pulses includes counting detector pair pulses.

10. A medical imaging system for use with a tracer substance, the tracer substance positioned within an organ to be imaged which is positioned within an imaging area, the substance generating sub-atomic particles which emanate therefrom, the system including at least one camera and a processor, the camera including a plurality of adjacent detector sets and positioned adjacent the imaging area, each detector set including a plurality of adjacent detectors, each detector detecting emanating particles and providing a pulse to the processor for each particle detected, the apparatus for, during an acquisition period that comprises sub-periods, generating at least one high resolution data acquisition and, during each sub-period, generating a unique low resolution data acquisition, the apparatus comprising:

- a programmed data processor which, during each sub-period, for each detector subset, counts the pulses generated by the subset detectors and stores the subset pulse counts as the low resolution acquisition data set associated with the sub-period and, during a high resolution period, for each detector, counts all of the pulses generated by the detector and storing the detector pulse counts as the high resolution acquisition data set.

11. The apparatus of claim 10 wherein the acquisition period is divisible into time intervals, each time interval including one sub-period and a remainder period, the high resolution period including all of the remainder periods.

12. The apparatus of claim 11 wherein the high resolution period consists of all of the remainder periods.

13. The apparatus of claim 11 wherein the high resolution period includes the entire acquisition period.

14. The apparatus of claim 11 wherein each sub-period has a duration which is less than a time interval.

15. The apparatus of claim 11 wherein each sub-period is a time interval.

16. The apparatus of claim 10 also for determining when the organ to be imaged shifts within the imaging area, the processor, beginning with the second low resolution data acquisition set, comparing consecutive low resolution data acquisition sets and, when consecutive low resolution data acquisition sets are appreciably different, indicating that a shift has occurred.

17. The apparatus of claim 16 also for causing a new high resolution data acquisition when it is perceived that the organ to be imaged shifted, the processor, after a shift has been indicated, storing subsequent high resolution data as a separate high resolution data set.

18. The apparatus of claim 10 wherein the camera is a positron emission detecting camera wherein emitted particles are grouped in particle pairs, each particle pair is detected by opposing detector pairs and the processor includes coincidence circuitry for identifying particle pairs which are detected by detector pairs, detector sub-sets include proximate detector pairs which are disposed in a single camera view and wherein, to count detector sub-set pulses, the processor counts coincident detector pair pulses corresponding to the detector pair subset while to count detector pulses the processor counts detector pair pulses.

* * * * *